UNITED STATES PATENT OFFICE.

ANTONIO MEUCCI, OF STAPLETON, AND TORELLO DEUDI, OF NEW YORK, N. Y.

PLASTIC PASTE.

SPECIFICATION forming part of Letters Patent No. 279,492, dated June 12, 1883.

Application filed March 8, 1883. (No specimens.)

*To all whom it may concern:*

Be it known that we, ANTONIO MEUCCI, of Stapleton, in the county of Richmond and State of New York, and TORELLO DEUDI, of the city, county, and State of New York, have invented a new and Improved Plastic Paste, of which the following is a full, clear, and exact description.

The object of our invention is to provide a new and improved plastic paste to be used for manufacturing various articles of art and industry—for instance, billiard-balls, figures, statuary, vases, moldings, and ornaments of various kinds.

Our composition consists of the following ingredients: glue or gelatine; gum-arabic or some analogous gum; vegetable fiber, ivory, bone, horn, or an analogous substance; corn-starch, or Indian meal, or buckwheat-flour; gum-resin, gum-mastic, or gum-sandarac, or an equivalent gum; crude petroleum, or vaseline, or paraffine, or dammar varnish, or spirits of turpentine, or muriatic acid, or stearic acid; nitrate of potassium, (saltpeter;) oxide of zinc or terra-alba.

In making the paste we proceed as follows: The glue or gelatine and the gum-arabic are dissolved in water, in the proportion of about three to four parts of glue or gelatine and one part of gum-arabic, to about the consistency of molasses. After the glue or gelatine has been thoroughly dissolved, vegetable fibers are added, which have been previously treated as described in the Patent No. 47,068, issued to Antonio Meucci on the 28th day of March, 1865—that is, the vegetable fiber or analogous substances are treated with gases generated by the action of nitro-muriatic acid upon carbonate of lime, and then washed and treated with caustic alkali, or alkali and oil, whereby the mineral, gummy, and resinous substances are removed from the fiber or cellular matter. Then from one to two parts of corn-starch, Indian meal, or buckwheat-flour, or another equivalent substance are added and the several ingredients steadily stirred, so that they will be thoroughly mixed. After they are properly mixed, one or two parts of varnish or cooked oil made up with gum-resin or gum-mastic and stearic acid and dammar varnish are added. In place of the dammar varnish, crude petroleum, vaseline, paraffine, or spirits of turpentine may be used, the mixture being thoroughly stirred and heated. Then six to eight parts of oxide of zinc, or oxide of zinc mixed with terra-alba, are added, and the mass is subjected to a mild heat produced by steam. In order that the mass will bind well, a small quantity of muriatic acid diluted with water is added from time to time. Then small quantities of oxide of zinc, or oxide of zinc and terra-alba, are added until the desired consistency is reached—that is, until the mass has sufficient body for molding. The mass is then placed into molds and subjected to pressure and to the action of heat until the objects become dry. The molds can be made of metal, terra-cotta, or any other suitable material.

In place of gelatine, ivory or bone powder may be used, the gelatine required being derived from the ivory, horn, or bone powder. We can produce the mass in two different ways, the product or result always being the same.

We will now give the two mixtures for producing the paste. One mixture consists of the following ingredients combined in the following proportions: gelatine or glue, two to four parts; muriatic acid, (diluted,) one to two parts; oxide of zinc, six to eight parts; terra-alba, two to four parts; starch or analogous material, one to two parts; fiber treated as above mentioned, one-fourth to one-half part; varnish or cooked oil, one to two parts. The other composition, which produces exactly the same result, and really consists of the same ingredients mixed in slightly-different proportions, consists of powdered bone, ivory, or horn, two to four parts; muriatic acid, (diluted,) one to two parts; oxide of zinc, six to eight parts; terra-alba, two to three parts; varnish, three to five parts; gum-sandarac, two to four parts; fiber, one-fourth to one-half part; paraffine, one-half to one part.

The article produced can be colored when molded, or the paste can be colored. The muriatic acid mixes with the terra-alba and the oxide of zinc and forms a chloride which becomes hard and tenacious and is not affected by moisture.

In the preparation of more delicate and expensive articles, the corn-starch, Indian meal, or buckwheat flour, or gelatine is replaced by powdered bone, horn, or ivory, which must be previously soaked in water mixed with muriatic acid and saltpeter, (nitrate of potassium,) and then boiled until they become soft and pasty and easily triturated in a mill.

The above-described paste can be manufactured very easily, is cheap, not explosive, and forms a hard and elastic mass.

Having thus described our invention, we claim as new and desire to secure by Letters Patent—

1. The herein-described composition of matter, consisting of gelatine or a substance containing gelatine, fiber deprived of its mineral, gummy, and resinous substances, varnish, oxide of zinc, terra-alba, and an acid mixed in the proportions given, as set forth.

2. The herein-described composition of matter, consisting of gelatine or a substance containing gelatine, fiber deprived of its mineral, gummy, and resinous substances, an acid, starch, or analogous substances, varnish, oxide of zinc, and terra-alba, mixed in the proportions given, as set forth.

ANTONIO MEUCCI.
TORELLO DEUDI.

Witnesses:
OSCAR F. GUNZ,
EDGAR TATE.

It is hereby certified that in Letters Patent No. 279,492, granted June 12, 1883, upon the application of Antonio Meucci and Torello Dendi, for an improvement in "Plastic Paste," the name of the patentee Dendi was erroneously printed Dendi; and that the grant should be read with this correction therein to make it conform with the record of the case in the Patent Office.

Signed, countersigned, and sealed this 19th day of June, A. D. 1883.

[SEAL.]

M. L. JOSLYN,
*Acting Secretary of the Interior.*

Countersigned:
 E. M. MARBLE,
  *Commissioner of Patents.*